(12) United States Patent
Cheng

(10) Patent No.: US 8,806,143 B1
(45) Date of Patent: Aug. 12, 2014

(54) QUEUING RECEIVED WRITE BLOCKS FOR REDUCING FILE FRAGMENTATION

(75) Inventor: Shiow-wen Wendy Cheng, Portland, OR (US)

(73) Assignee: NetApp, Inc., Sunnyvale, CA (US)

( * ) Notice: Subject to any disclaimer, the term of this patent is extended or adjusted under 35 U.S.C. 154(b) by 1155 days.

(21) Appl. No.: 12/577,000

(22) Filed: Oct. 9, 2009

(51) Int. Cl.
*G06F 12/00* (2006.01)

(52) U.S. Cl.
USPC .............................. 711/144; 707/799; 710/52

(58) Field of Classification Search
USPC .......................... 711/4, 144; 707/799; 710/52
See application file for complete search history.

(56) References Cited

U.S. PATENT DOCUMENTS

| | | | |
|---|---|---|---|
| 6,038,570 A * | 3/2000 | Hitz et al. | 1/1 |
| 6,148,368 A | 11/2000 | DeKoning | |
| 2003/0023711 A1 * | 1/2003 | Parmar et al. | 709/223 |
| 2005/0154825 A1 * | 7/2005 | Fair | 711/113 |
| 2008/0040368 A1 * | 2/2008 | Li et al. | 707/101 |

* cited by examiner

*Primary Examiner* — Kalpit Parikh
(74) *Attorney, Agent, or Firm* — Kacvinsky Daisak Bluni PLLC

(57) ABSTRACT

A method and apparatus for queuing FBNs of received write blocks for a file to a queuing data structure for assigning LBNs to the FBNs is described herein. A queuing data structure may comprise a modified binary search tree, such as a modified red-black search tree. Each node of a queuing data structure may comprise a base field for storing a base FBN and a range field for storing a range value comprising X bits. The range field of a single node may represent a range of two or more FBNs ("FBN range"), the FBN range being based on the base FBN. Each FBN in the FBN range may have a corresponding bit in the range field, the base FBN corresponding to a "base bit" in the range field. The value of the corresponding bit in the range field may indicate whether the FBN has been received.

23 Claims, 7 Drawing Sheets

QUEUING RECEIVED WRITE BLOCKS FOR REDUCING FILE FRAGMENTATION

FIELD OF THE INVENTION

The present invention relates to storage systems, and particularly, to queuing received write blocks for reducing file fragmentation.

BACKGROUND OF THE INVENTION

A storage system is a processing system adapted to store and retrieve information/data on storage devices (such as disks). The storage system includes a storage operating system that implements a file system to logically organize the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from Netapp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The applications executing on the server system may send an access requests (read or write requests) to the storage system for accessing particular data stored on the storage system.

A received write request may comprise an inode number, one or more blocks of data to be written (referred to herein as "write blocks"), and a file block number (FBN) for each write block. In general, the file system may represent each file using an inode data structure and assign, for each file and corresponding inode data structure, a unique inode number. Each data block of a file may be uniquely identified within the file by a file block number (FBN) that indicates the ordering position of the data blocks within a file. Note, however, that a FBN for a data block does not necessarily indicate the physical storage location of the data block on a storage device. As such, each data block in the file system may be uniquely identified within the file system by the combination of an inode number (indicating the file and inode data structure containing the data block) and an FBN (indicating the ordering position of the data block within the file).

When receiving write requests, the storage system may implement queuing techniques to reduce file fragmentation, and thus reduce read latency. In general, when the storage system receives a write request containing one or more write blocks, the file system may assign, to each write block, a logical block number (LBN) that specifies the physical storage location of where the write block will be stored on a storage device. As such, each received write block may have an associated file identifier (inode number) indicating the file that contains it and FBN (indicating its ordering position within the file), and will be assigned an LBN (indicating the storage location on a storage device).

If the storage system does not perform queuing techniques and assigns LBNs as the write requests are received, significant file fragmentation may result, thus causing significant read latency later. For example, assume a first write request for file A and FBN 10-12 is received, a second write request for file A and FBN 2-9 is then received, a third write request for file A and FBN 13-21 is thereafter received, and write requests for other various files were received between the first, second, and third write requests. If the storage system does not perform queuing techniques and assigns LBNs as the write requests are received, the file system may assign, for example, LBN 119-121 to FBN 10-12, LBN 222-229 to FBN 2-9, and LBN 381-389 and FBN 13-21 for file A. As such, the data blocks of file A are stored on a storage device in an interspersed and non-contiguous manner with significant file fragmentation. Upon receiving a later read request for file A, data blocks of file A are retrieved from the storage device at interspersed and non-contiguous storage locations, thus incurring significant read latency. For example, if the storage device comprises a disk device, the data blocks of file A may be stored on different tracks of the disk device, thus a later read request for file A will incur significant seek times (the time it takes to move a read/write head of the disk device to the different tracks).

As such, queuing techniques have been developed to reduce file fragmentation and read latency. In general, when the storage system receives write requests, the file system does not assign LBNs to the write blocks as they are received, but rather queues the write requests and delays assignment of LBNs until a batch of write blocks are received. For example, the file system may assign LBNs at a consistency point that is triggered at predetermined time intervals or when a predetermined number of write blocks have been received. At the consistency point, for each file having a write request, the file system may produce an ordered list of the FBNs of the received write blocks (e.g., from lowest to highest FBN). In the example above, for file A, the file system may arrange the FBNs of the write blocks in the following order: FBN 2-9, FBN 10-12, and FBN 13-21. The file system may then assign consecutive LBNs to the write blocks of each file according to the ordering of the FBNs of the write blocks produced for each file. In the example given above, the file system may assign, for example, LBN 119-126 to FBN 2-9, LBN 126-128 to FBN 10-12, and LBN 129-137 to FBN 13-21 for file A. As such, the data blocks of file A are stored on a storage device in a more contiguous manner with less file fragmentation. Upon receiving a later read request for file A, data blocks of file A are retrieved from the storage device at more contiguous storage locations, thus incurring less read latency.

A conventional queuing technique uses binary search trees (BST), such as a red-black search tree which is a type of self-balancing binary search tree. A BST may comprise a node-based binary tree data structure and comprise nodes having parent-child relationships. A single BST may represent FBNs of write blocks received for a single file, a single node representing an FBN of a single write block. As write blocks are received for a file, each write block is represented by a node that is inserted into the BST for the file (and in particular, the FBN of each write block is represented by a node that is inserted into the BST for the file). At the consistency point, the nodes of the BST may be traversed to produce a list of the FBNs of the received write blocks, the FBNs being ordered from lowest to highest FBN. The LBNs may then be assigned according to the ordered list of FBNs.

Although BSTs (such as a red-black trees) provide for fast and efficient search and traverse operations, use of BSTs in queuing techniques also requires extensive memory resources. In a conventional BST, each node may itself comprise a data structure containing a plurality of data fields used for representing a single FNB of a single write block. For example, a BST is typically configured such that each node (representing an FBN) has one parent node, one left child node (representing a lower FBN), and one right child node (representing a higher FBN). When a node represents an FBN, the FBN comprises a "key value" of the node. As such, each node may contain 4 data fields, including fields for: its key value (i.e., the FBN it represents), a pointer to the parent node, a pointer to the left child node, and a pointer to the right child node. If each data field comprises one word (e.g., 32 bits), each node in a BST may require 4 words of data. For example, a BST comprising 32 nodes, for representing 32 FBNs, requires 128 words of memory space. For a BST comprising a red-black tree, each node may also contain an additional color field for indicating the associated color of the node (red or black). As such, each node in a red-black tree may require 5 words of data, whereby 32 nodes, for representing 32 FBNs, requires 160 words of memory space.

When receiving large numbers of write blocks, the amount of memory space need to process the write blocks using conventional queuing techniques may become very large. As such, there is a need for a method and apparatus for queuing received write blocks for assigning LBNs that is more memory efficient.

SUMMARY OF THE INVENTION

As described herein, a storage system receives a plurality of write blocks (received in write requests) having FBNs for various files, the FBNs of the write blocks to be assigned LBNs and the write blocks to be stored to storage devices at the assigned LBNs. In some embodiments, queuing data structures, requiring less memory space than conventional BSTs, may be used to queue and process the plurality of received FBNs of write blocks prior to assigning LBNs for the FBNs and storing the write blocks to storage devices at the assigned LBNs. Each received write block may have an associated file identifier (inode number) and a file block number (FBN). A queuing data structure may be produced/provided for each file to represent the FBNs of write blocks received for the file. In some embodiments, a queuing module/engine in the operating system of the storage system may perform embodiments described herein using the queuing data structures. A queuing data structure may comprise a modified binary search tree. Each node of the queuing data structure may comprise a range field for representing a plurality of FBNs, the range field storing a range value comprising X bits, each bit corresponding to an FBN. The value of the corresponding bit in the range field may indicate whether the FBN has been received.

The queuing data structures may comprise modified binary search trees (BSTs), such as modified red-black trees. In some embodiments, each node of a queuing data structure may comprise a data structure comprising a plurality of data fields, the fields including a base field (storing a "base FBN" value) and a range field (storing a range value comprising X bits). A node may also comprise other data fields for a pointer to the parent node, a pointer to the left child node, a pointer to the right child node, and/or color of the node (where the queuing data structure comprises a modified red-black tree).

The range field of a single node may represent a range of two or more FBNs ("FBN range"), the range field indicating whether one or more FBNs within the FBN range has been received. In some embodiments, the total number of FBNs comprising the FBN range may be dependent on the number of bits (X) in the range field, X being an integer. In these embodiments, each range field of a node may represent up to a maximum of X total FBNs (that collectively comprise the FBN range). For example, if the range field comprises one word comprising 32 bits, each node can represent 32 FBNs of 32 received write blocks (the FBN range having a span of 32 FBNs).

In some embodiments, the values of the FBNs in the FBN range may be based on the base FBN value specified in the base field (the base FBN being within the FBN range), as well as the number of bits (X) in the range field (X being the number of FBNs in the FBN range). For example, the base FBN may comprise a lowest FBN in the FBN range, whereby the FBN range represented by a node may comprise [base FBN through (base FBN+X−1)]. As another example, the base FBN may comprise a highest FBN in the FBN range, whereby the FBN range represented by a node may comprise [(base FBN−X−1) through base FBN]. In other embodiments, the base FBN may comprise an FBN between the lowest and highest FBNs in the FBN range. To illustrate, if X=32 (so that the FBN range comprises 32 FBNs) and the base FBN equals 0, the FBN range represented by the range field may comprise FBNs 0-31. As used herein, an FBN within the FBN range that is not the base FBN is referred to as a non-base FBN (e.g., FBNs 1-31).

In some embodiments, each FBN in the FBN range may have a corresponding bit in the range field that represents the FBN, the base FBN corresponding to a "base bit" in the range field. The corresponding bit for each non-base FBN has an offset from the base bit and a bit position within the range field that is based on the distance/difference in the values between the non-base FBN and the base FBN. For example, if the base FBN equals 0 and comprises the lowest FBN in the FBN range, the base FBN 0 may correspond to the least significant bit (LSB) position in the range field. For a non-base FBN that equals 3, the difference in values between non-base FBN 3 and base FBN 0 is 3. As such, the corresponding bit for non-base FBN 3 may have an offset of 3 from the base bit in the range field (whereby the corresponding bit comprises the fourth least significant bit position in the range field).

The value of the corresponding bit in the range field that represents an FBN may indicate whether the FBN has been received (i.e., is in the plurality of received FBNs) or has not been received (i.e., is not in the plurality of received FBNs). For example, a bit in the range field corresponding to an FBN is equal to 1 if the FBN is in the plurality of received FBNs and is equal to 0 if the FBN is not in the plurality of received FBNs. The default values of all bits in the range field of all nodes may initially be set to equal "0." Upon receiving a particular FBN of a write block, the corresponding bit representing the particular FBN may then be set to "1" to indicate that the particular FBN was received in the plurality of FBNs. As such, if a particular FBN of a write block is not received, the corresponding bit representing the particular FBN remains at "0" indicating that the particular FBN was not received in the plurality of FBNs. Or a bit in the range field corresponding to an FBN is equal to 0 if the FBN is in the plurality of received FBNs and is equal to 1 if the FBN is not in the plurality of received FBNs.

The queuing data structures may be used to process the received plurality of FBNs of write blocks prior to assigning LBNs for the FBNs and storing the write blocks to storage devices at the assigned LBNs. In general, operations may be performed on each queuing data structure (provided for a file) to arrange/order the FBNs of write blocks received for the file based on the values of the received FBNs ("value ordered"). For example, the queuing data structure may be used to produce a list of FBNs ordered from lowest to highest FBN. For example, operations performed on each queuing data structure to produce a value ordered list of FBNs may include search, sort and insert, and/or traverse operations. The LBNs may then be assigned to the FBNs of received write blocks using the list of value ordered FBNs. For example, the list of value ordered FBNs may be assigned consecutive (or consecutive as possible) LBNs, whereby the corresponding write blocks are stored to the assigned LBNs. As discussed above, assigning LBNs to value ordered FBNs may be preferred over assigning LBNs as the FBNs are received (i.e., time ordered FBNs) to reduce file fragmentation and read latency.

As described above, by using the range field, each node in a queuing data structure may represent X FBNs of received write blocks (X being the bit size of the range field, whereby each bit represents a corresponding FBN). As such, using the queuing data structure may reduce memory requirements for queuing received write blocks. For example, for a queuing data structure comprising a modified BST, each node of a modified BST may comprise 5 data fields, including fields for: a pointer to the parent node, a pointer to the left child node, a pointer to the right child node, base FBN value, and range value. Also, each node of a modified red-black tree may comprise an additional sixth data field for color. If each data field comprises a 32 bit word, in a best-case scenario (i.e., where 32 consecutive FBNs are received that fall into the FBN range of the node), a modified BST may represent up to 32 FBNs using only 5 words of memory space. This is in comparison to a conventional BST that requires 128 words of memory space for representing 32 FBNs. In a best case scenario for a modified red-black tree, each node may represent up to 32 FBNs using only 6 words of memory space. This is in comparison to a conventional red-black tree that requires 160 words of memory space for representing 32 FBNs. In less than best-case scenarios, use of the modified BSTs will also typically provide substantial memory savings. A node of a modified BST only needs to represent 2 FBNs to experience memory savings over conventional methods (since 5 words are thus being used to represent 2 FBNs, compared to 10 words or 12 words needed to represent 2 FBNs in conventional BSTs or red-black trees, respectively).

Using the queuing data structure may also improve the speed of operations used for queuing and processing received write blocks, such as searching, sorting, and traversing operations. Since the queuing data structure will have a reduced tree height (due to the lower total node count), the operations processing the nodes of the queuing data structure may require less time.

BRIEF DESCRIPTION OF THE DRAWINGS

The novel features are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into three sections. Section I describes a storage system environment in which some embodiments operate. Section II describes queuing write blocks using queuing data structures having nodes using a range field. Section III describes methods for using the queuing data structures for queuing write blocks and assigning LBNs.

I. Storage System Environment

Figure 1:
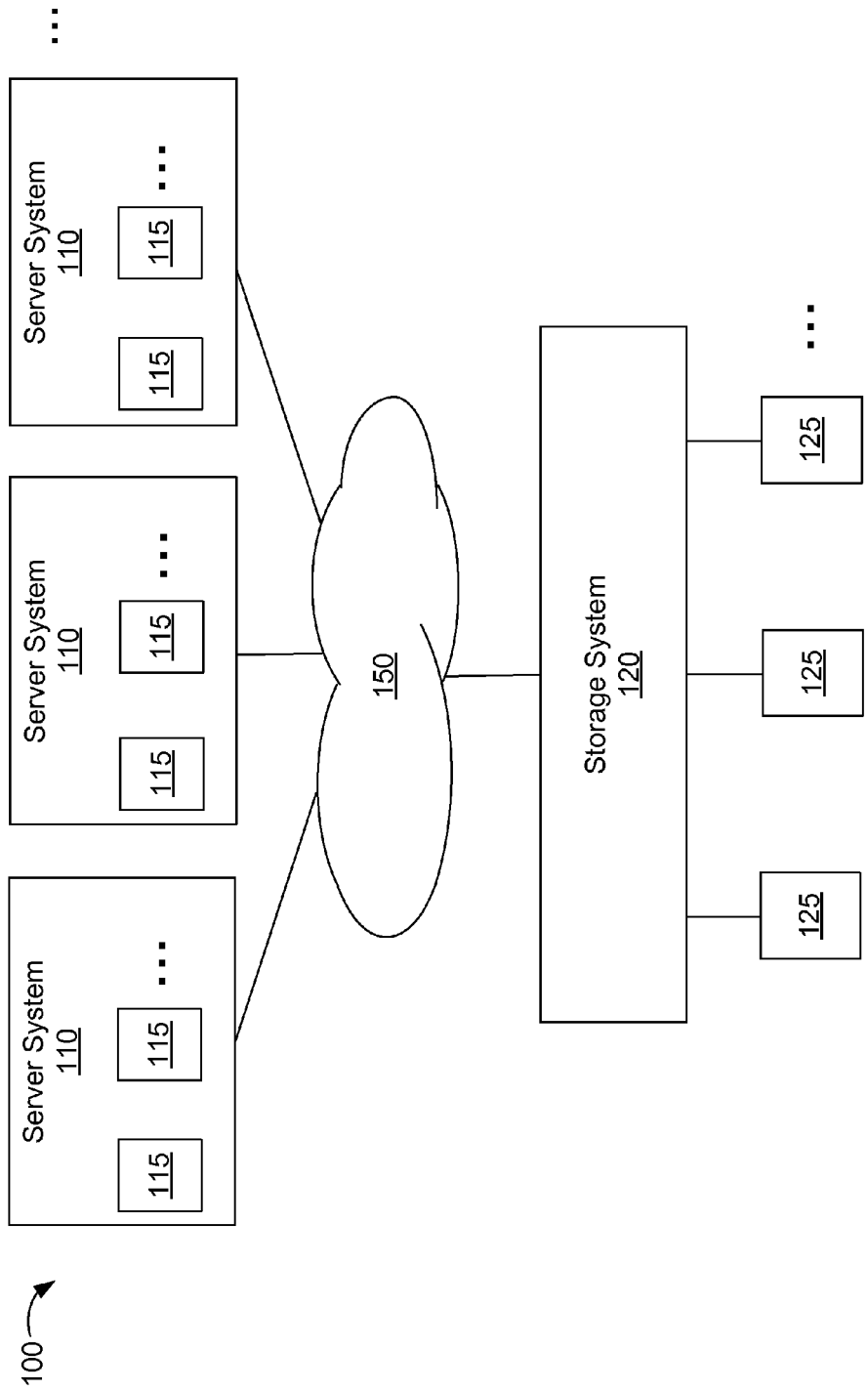
FIG. 1 is a schematic block diagram of an exemplary storage system environment in which some embodiments operate.

FIG. 1 is a schematic block diagram of an exemplary storage system environment 100 in which some embodiments operate. The environment 100 comprises a one or more server systems 110 and a storage system 120 (comprising one or more storage devices 125) that are connected via a connection system 150. The connection system 150 may comprise a network, such as a Local Area Network (LAN), Wide Area Network (WAN), metropolitan area network (MAN), the Internet, or any other type of network or communication system between computer systems. A server system 110 may comprise a computer system that utilizes services of the storage system 120 to store and manage data in the storage devices 125 of the storage system 120. A server system 110 may execute one or more applications 115 that submit read/write requests for reading/writing data on the storage devices 125 of the storage system 120.

Interaction between a server system 110 and the storage system 120 can enable the provision of storage services. That is, server system 110 may request the services of the storage system 120 (e.g., through read or write requests), and the storage system 120 may perform the requests and return the results of the services requested by the server system 110, by exchanging packets over the connection system 150. The server system 110 may issue access requests (e.g., read or write requests) by issuing packets using file-based access protocols, such as the Common Internet File System (CIFS)

protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The storage system 120 may comprise a computer system that stores data in a set of one or more storage devices 125. A storage device 125 may comprise a writable storage device media, such as disk devices, video tape, optical, DVD, magnetic tape, and any other similar media adapted to store information (including data and parity information). In some embodiments, a storage device 125 comprises a disk device (described in detail below). In other embodiments, the storage device 125 may comprise any other type of storage device.

The storage system 120 may implement a file system to logically organize the data as a hierarchical structure of directories and files on each storage device 125. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125. The block may vary widely in data size (e.g., 1 byte, 4-kilobytes (KB), 8 KB, etc.).

Figure 2:
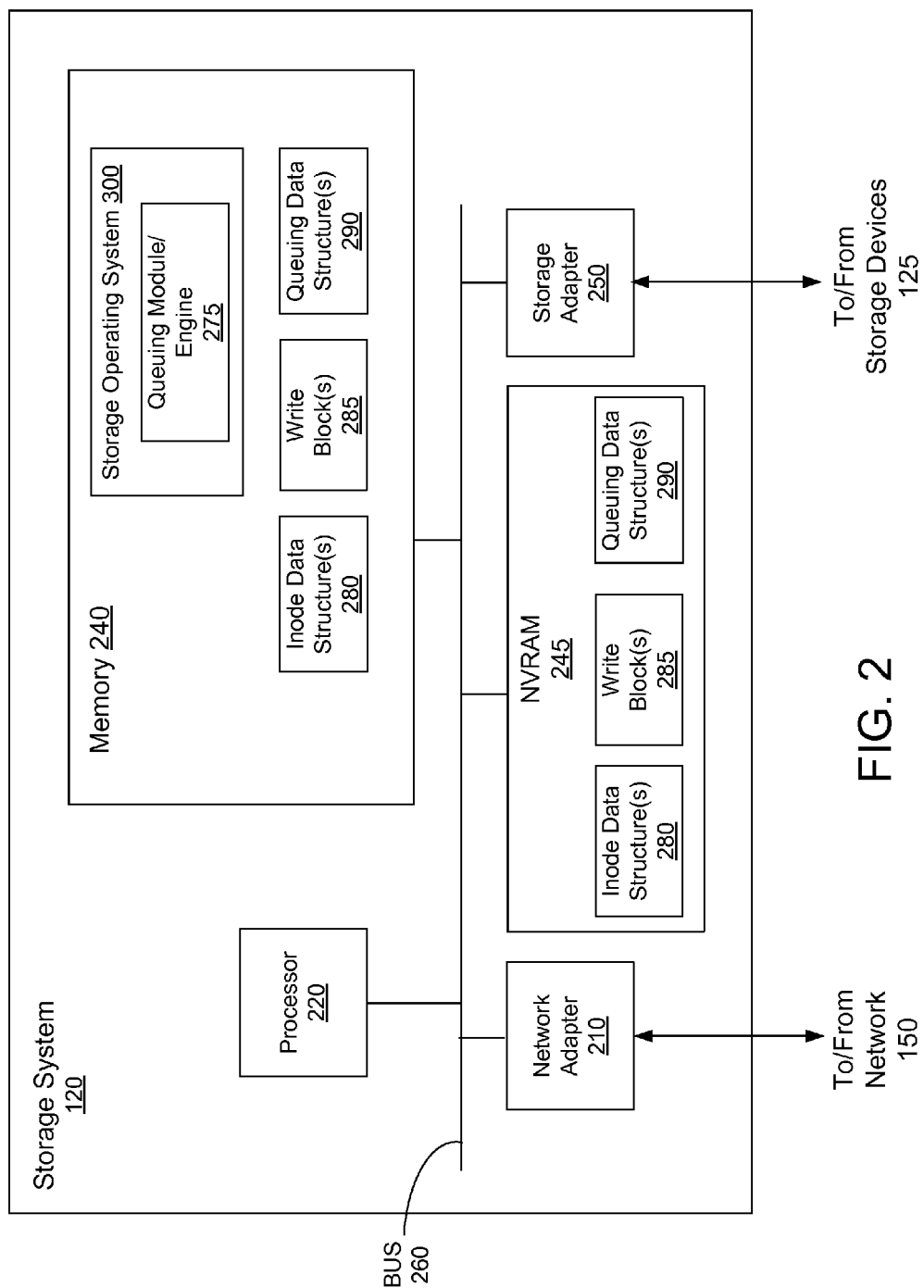
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. a FLASH memory), that holds the last state of the memory in the event of any power loss to the array. Therefore, even if an access request stored in memory 240 is lost or erased (e.g., due to a temporary power outage) it still may be recovered from the NVRAM 245.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a queuing module 275) that are executed by the processor 220. Portions of the storage operating system 300 are typically resident in memory 240. It will be apparent to those skilled in the art, however, that other processing and memory means, including various computer readable media, may be used for storing and executing program instructions pertaining to the storage operating system 300. In some embodiments, also resident in memory 240 are one or more inode data structures 280, one or more write blocks 285 (received in write requests), and one or more queuing data structures 290. In other embodiments, the inode data structure(s) 280, write block(s) 285, and queuing data structure(s) 290 may also be resident in NVRAM 245 and/or stored on a storage device 125.

The storage adapter 250 cooperates with the storage operating system 300 executing on the storage system 120 to access data requested by the server system 110. The data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 125 may comprise disk devices that are arranged into a plurality of volumes, each having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
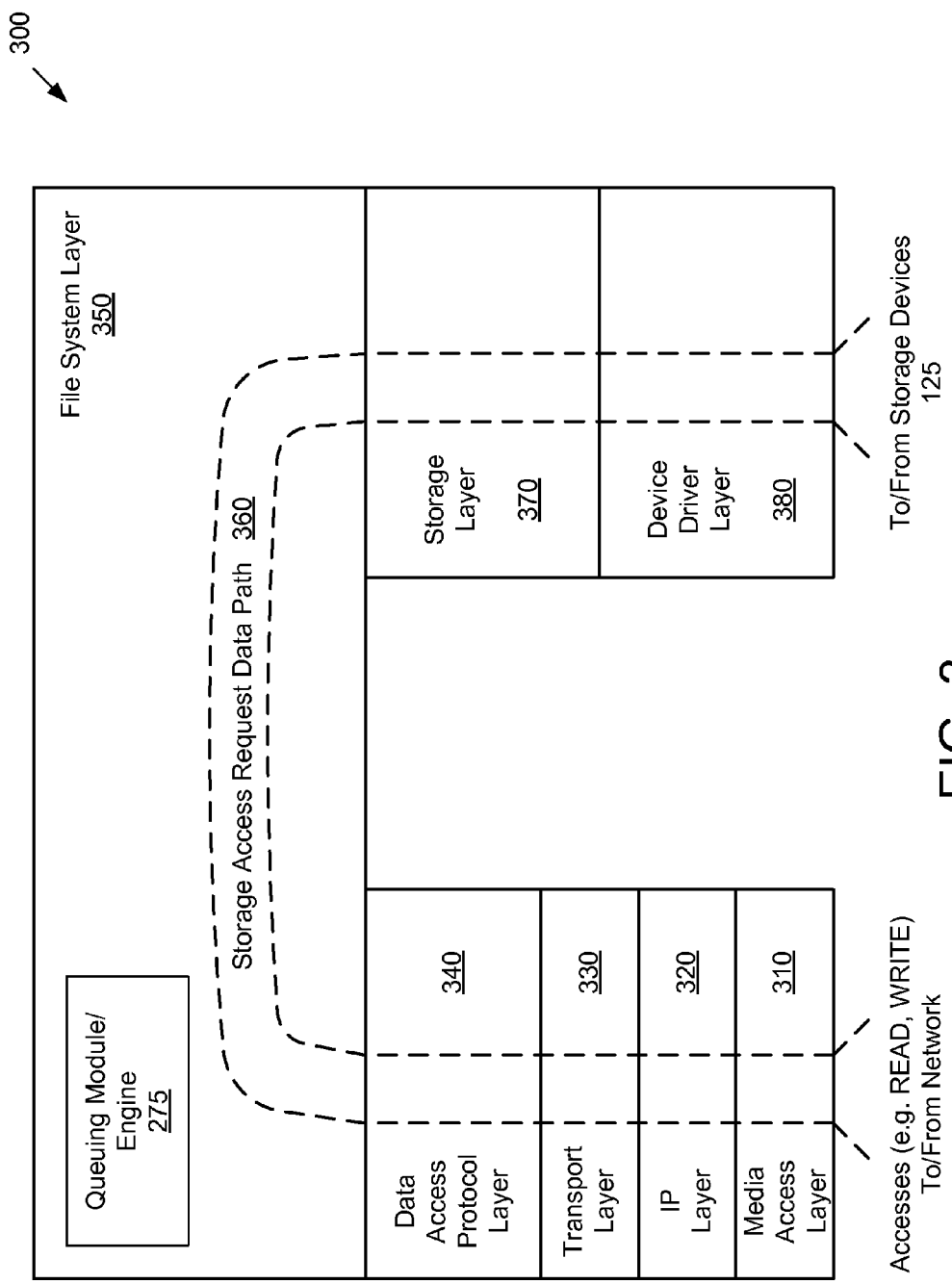
FIG. 3 is a schematic block diagram of an exemplary storage operating system that may be implemented by the storage system in FIG. 2.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

The storage operating system 300 may manage the primary storage devices 125 using a storage layer 370 that implements a storage protocol (such as a RAID protocol) and a device driver layer 380 that implements a device control protocol (such as small computer system interface (SCSI), integrated drive electronics (IDE), etc.).

Bridging the storage-side layers 370 and 380 with the network and protocol layers is a file system layer 350 of the storage operating system 300. In an illustrative embodiment, the file system layer 350 implements a file system having an on-disk format representation that is block-based using inodes (inode data structures) to describe the files.

The file system layer 350 assigns, for each file, a unique inode number and an associated inode. An inode may comprise a data structure used to store metadata information about the file (such as name of the file, when the file was produced or last modified, ownership of the file, access permission for the file, size of the file, etc.). Each inode may also contain pointers to address locations where the data blocks of the file are stored on a storage device 125. For example, a pointer to a data block may comprise a mapping of an FBN of the block to an LBN on a storage device 125. In general, there are typically two types of inodes—an "on-memory" inode and an "on-disk" inode. The data stored in the "on-disk" inode may include the data discussed above, such as file metadata and pointers to data blocks. The data stored in the on-memory inode may include all the data of the on-disk inode, but also include additional processing data used to determine the "final" data contained in the on-disk inode. In some embodiments, as used herein, an inode 280 may refer to an on-memory inode.

For example, the additional processing data stored in an inode 280 may include a pointer to a queuing data structure 290 associated with the inode 280. In these embodiments, each file and inode 280 has an associated queuing data structure 290 used to queue and process FBNs of write blocks received for the file. A pointer to the root node of the associated queuing data structure 290 may be stored in the inode 280.

As a further example, the additional processing data stored in an inode 280 may include pointers to write blocks 285 received for the file and temporarily stored to memory 240. In these embodiments, the file system 350 may receive write requests, each write request specifying an inode number and containing one or more blocks of data to be written ("write blocks"), a file block number (FBN) being specified for each write block. The FBNs of the received write blocks may be added to and processed in the queuing data structure 290 associated with the inode 280 (identified by the inode number), the queuing data structure 290 being located using a pointer to its root node stored in the inode 280. While the FBNs of the write blocks are being processed in the queuing data structure 290 for assigning LBNs to the FBNs, the write blocks may be temporarily stored to memory 240 (prior to storing to a storage device 125) and pointers to the write blocks 285 may be stored in the inode 280. For example, a pointer to a write block may comprise a mapping of an FBN of the write block to a memory address in memory 240.

In response to receiving a file-access request (containing an external file handle) from a server system 110, the file system 350 generates operations to load (retrieve) the requested data from storage devices 125 (if it is not resident in the storage system's memory 240). The external file handle in the access request typically identifies a file or directory requested by the server system 110. Specifically, the file handle may specify a generation number, inode number and volume number corresponding to the requested data. If the information is not resident in the storage system's memory 240, the file system layer 350 uses the received inode number to access the appropriate inode and retrieve file location information (e.g., logical block numbers) from the inode.

The file system layer 350 then passes the logical block number to the appropriate driver (for example, an encapsulation of SCSI implemented on a fibre channel interconnection) of the device driver layer 380. The device driver layer 380 accesses the appropriate blocks from the storage devices 125 and loads the requested data in memory 240 for processing by the storage system 120. Upon successful completion of the request, the storage system (and storage operating system) returns a response (e.g., a conventional acknowledgement packet defined by the CIFS specification) to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file service request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

In some embodiments, the storage system environment 100 may comprise a plurality of interconnected storage systems 120 to provide a storage system architecture configured to service many clients. In some embodiments, the storage system architecture provides aggregates and volumes distributed across a plurality of nodes interconnected as a cluster. The aggregates may be configured to contain one or more volumes. Each node of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. The storage server of each node may be embodied as a disk element (D-blade) and the multi-protocol engine may be embodied as a network element (N-blade). The N-blade receives a multi-protocol data access request from a client, converts that access request into a cluster fabric (CF) message and redirects the message to an appropriate D-blade of the cluster. As such, the cluster may comprise a plurality of interconnected nodes configured to provide storage services for a set of storage devices 125. The nodes comprise various functional components that cooperate to provide a distributed storage system architecture of the cluster 100. Each node may be organized as a network element (N-blade) and a disk element (D-blade). The N-blade may include functionality that enables the node to connect to clients over a computer network 150, while each D-blade connects to one or more storage devices 125. The N-blade may comprise the software layers 310-340 comprising the left side of FIG. 3 (excluding the file system 350). The D-blade may comprise the software layers 350, 370, and 380 comprising the right side of FIG. 3 (including the file system 350). In some embodiments, the queuing module 275 may reside in the D-blade.

In some embodiments, the storage operating system 300 comprises a queuing module 275 that operates in conjunction with the other software layers and file system of the storage operating system 300 to queue and process FBNs of write blocks using the queuing data structures (for assigning LBNs to the FBNs and storing the write blocks to storage devices at the assigned LBNs). For example, in some embodiments, the queuing module 275 may reside within the file system layer 350 of the storage operating system 300 (as shown in FIG. 3). In other embodiments, the queuing module 275 may reside within or near other layers of the storage operating system 300.

In some embodiments, the queuing module 275 may be pre-included in storage operating system 300 software. In other embodiments, the queuing module 275 may comprise an external auxiliary plug-in type software module that works with the storage operating system 300 to enhance its functions. As such, the queuing module 275 may be imposed upon an existing storage operating system 300 and file system 350 to queue write blocks as described herein.

II. Queuing Write Blocks Using Queuing Data Structures

Figure 4:
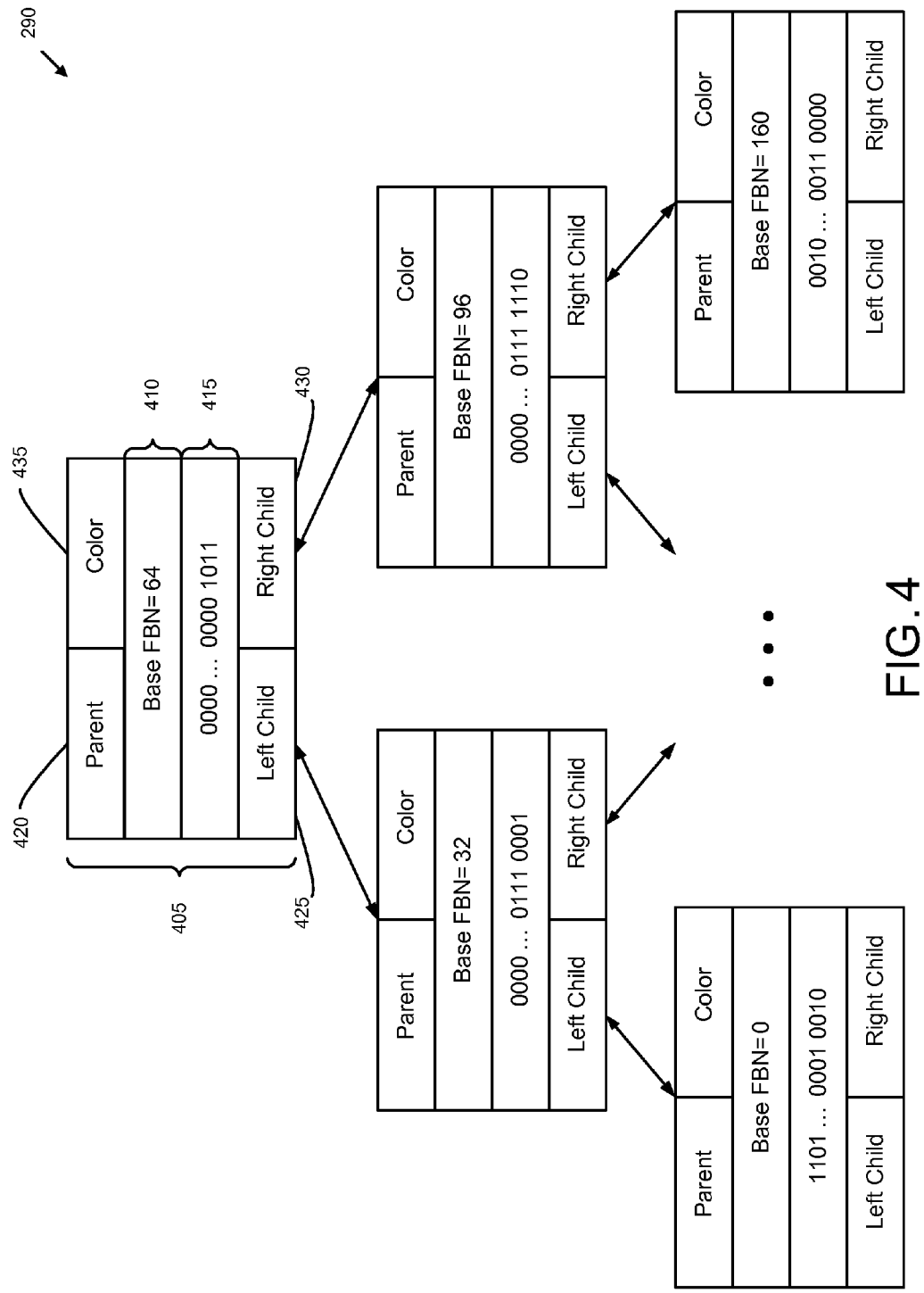
FIG. 4 shows a conceptual diagram of an exemplary queuing data structure used in some embodiments.

The queuing data structures 290 may comprise modified binary search trees (BSTs), such as modified red-black trees. FIG. 4 shows a conceptual diagram of an exemplary queuing data structure 290 used in some embodiments. The exemplary queuing data structure 290 may be associated with a particular file and inode 280, the inode 280 storing a pointer to a root node (most top node) of the queuing data structure 290 associated with the inode 280.

The queuing data structure 290 may comprise one or more nodes 405, each node 405 comprising a data structure comprising a plurality of data fields. The data fields of a node 405 may include a base field 410 for storing a "base FBN" value and a range field 415 for storing a range value comprising X bits. A node 405 may also comprise other data fields, such as a parent field 420 (for storing a pointer to the parent node), a left child field 425 (for storing a pointer to the left child node), and a right child field 430 (for storing a pointer to the right child node), and/or a color field 435 (for storing the color of the node where the queuing data structure comprises a modified red-black tree).

The queuing data structure 290 may be configured such that each node (having a base FBN) has one parent node, one left child node (having a lower base FBN), and one right child node (having a higher base FBN). As such, the basic structure of the queuing data structure 290 and particular operations (e.g., traversing) performed on the queuing data structure 290 may be determined by the base FBNs of the nodes 405.

The range field 415 of a single node may represent a range of two or more FBNs ("FBN range"), the range field 415 indicating whether one or more FBNs within the FBN range has been received. In some embodiments, the total number of FBNs comprising the FBN range may be dependent on the number of bits (X) in the range field, X being an integer. In these embodiments, each range field of a node may represent up to a maximum of X total FBNs (that collectively comprise the FBN range).

In some embodiments, the values of the FBNs in the FBN range may be based on the base FBN value specified in the base field (the base FBN being within the FBN range), as well as the number of bits (X) in the range field (X being the number of FBNs in the FBN range). For example, the base FBN may comprise a lowest FBN in the FBN range, whereby the FBN range represented by a node may comprise [base FBN through (base FBN+X−1)]. In other embodiments, the base FBN may comprise a highest FBN in the FBN range, whereby the FBN range represented by a node may comprise [(base FBN−X−1) through base FBN]. In other embodiments, the base FBN may comprise an FBN between the lowest and highest FBNs in the FBN range. As used herein, an FBN within the FBN range that is not the base FBN is referred to as a non-base FBN. In the example of FIG. 4, the range field comprises 32 bits and the base FBN comprises a lowest FBN in the FBN range. In other embodiments, the range field comprises another number of bits. As such, each node represents 32 FBNs of 32 received write blocks (the FBN range having a span of 32 FBNs). Thus, the FBN ranges of the nodes in the queuing data structure 290 may be configured as follows: FBN 0-31, FBN 32-63, FBN 64-95, FBN 96-127, FBN 128-159, FBN 160-191, etc.

Figure 5:
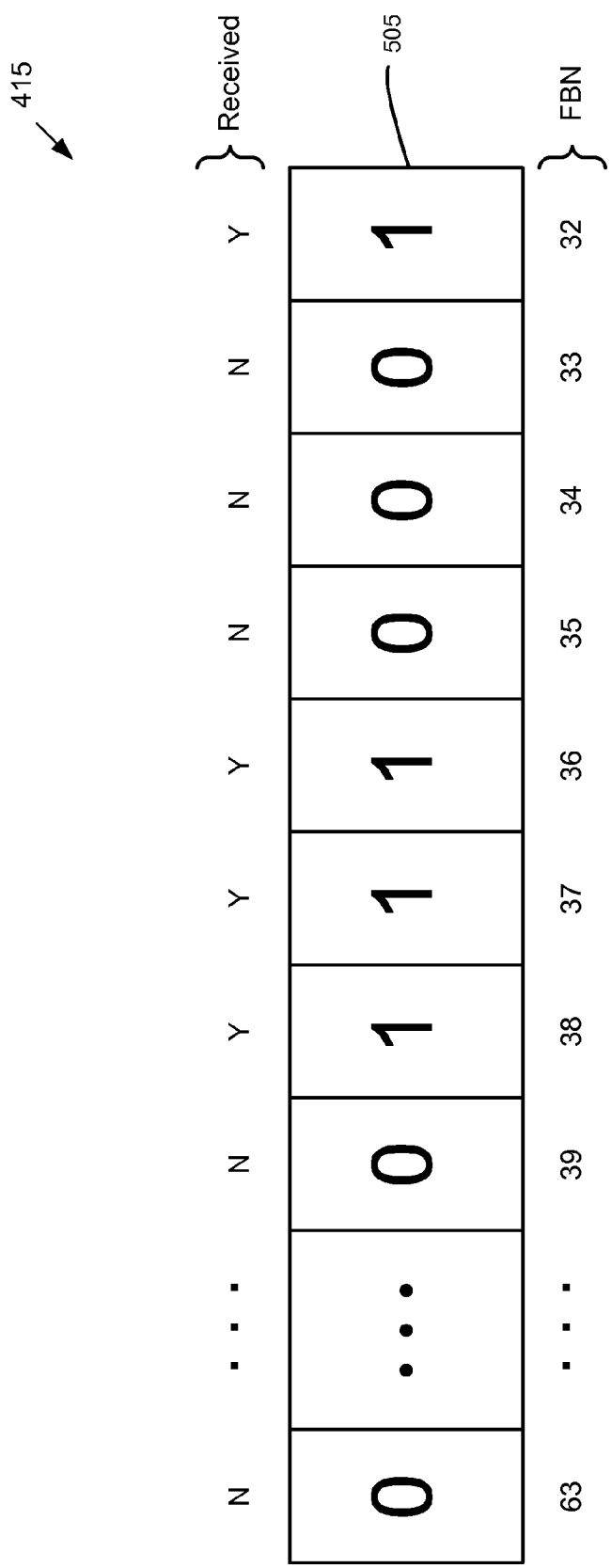
FIG. 5 shows a conceptual diagram of an exemplary range field of a queuing data structure used in some embodiments.

In some embodiments, each FBN in the FBN range may have a corresponding bit in the range field 415 that represents the FBN, the base FBN corresponding to a "base bit" in the range field. For example, the base bit may comprise the least significant bit, the most significant bit, or another bit in the range field 415. FIG. 5 shows a conceptual diagram of an exemplary range field 405 (comprising a range value) of a queuing data structure 290 used in some embodiments. In the example of FIG. 5, the base FBN equals 32 (in the FBN range 32-63) and corresponds to the base bit comprising the least significant bit (LSB) 505 in the range field 415.

The corresponding bit for each non-base FBN (e.g., FBNs 33-63) has an offset from the base bit and a bit position within the range field 415 that is based on the distance/difference in the values between the non-base FBN and the base FBN. In some embodiments, the corresponding bit for a non-base FBN has an offset from the base bit in the range field equal to (non-base FBN-base FBN). For example, for non-base FBN 33, the difference in values between non-base FBN 33 and base FBN 32 is 1. As such, the corresponding bit for non-base FBN 33 has an offset of 1 from the base bit in the range field, whereby the corresponding bit comprises the second least significant bit position in the range field 415, as shown in the example of FIG. 5. Likewise, non-base FBN 34 has a difference of 2 with base FBN 32 so its corresponding bit has an offset of 2 from the base bit in the range field 415, non-base FBN 35 has a difference of 3 with base FBN 32 so its corresponding bit has an offset of 3 from the base bit in the range field 415, . . . non-base FBN 63 has a difference of 31 with base FBN 32 so its corresponding bit has an offset of 31 from the base bit in the range field 415.

The value of the corresponding bit in the range field 415 that represents an FBN may indicate whether the FBN has been received (i.e., is in the plurality of received FBNs since the last consistency point) or has not been received (i.e., is not in the plurality of received FBNs since the last consistency point). In the example of FIG. 5, the default values of all bits in the range field 415 of all nodes 405 are initially set to equal "0." Upon receiving a particular FBN of a write block, the corresponding bit representing the particular FBN may then be set to "1" to indicate that the particular FBN was received. As such, if a particular FBN of a write block is not received, the corresponding bit representing the particular FBN remains at "0" indicating that the particular FBN was not received. Thus, in the example of FIG. 5, a bit in the range field corresponding to an FBN is equal to 1 if the FBN is in the plurality of received FBNs and is equal to 0 if the FBN is not in the plurality of received FBNs. In other embodiments, a bit in the range field corresponding to an FBN is equal to 0 if the FBN is in the plurality of received FBNs and is equal to 1 if the FBN is not in the plurality of received FBNs.

As shown in the example of FIG. 5, the range field 415 indicates that FBNs 32, 36, 37, and 38 have been received and all other FBNs in the FBN range 32-63 have not been received since the last consistency point. The range field 415 shown in FIG. 5 corresponds to the node 405 in FIG. 4 having base FBN 32. In the example of FIG. 4, for the node 405 having base FBN 64, the range field 415 indicates that FBNs 64, 65, and 67 have been received and all other FBNs in the FBN range 64-95 have not been received; for the node 405 having base FBN 96, the range field 415 indicates that FBNs 97, 98, 99, 100, 101, and 102 have been received and all other FBNs in the FBN range 96-127 have not been received, and so forth.

As described above, by using the range field 415, each node 405 in a queuing data structure 290 may represent X FBNs of received write blocks (X being the bit size of the range field, whereby each bit represents a corresponding FBN). As such, using the queuing data structure may reduce memory requirements for queuing received write blocks. For example, for a queuing data structure comprising a modified BST, each node of a modified BST may comprise 5 data fields, including fields for: a pointer to the parent node, a pointer to the left child node, a pointer to the right child node, base FBN value, and range value. Also, each node of a modified red-black tree may comprise an additional sixth data field for color. If each data field comprises a 32 bit word, in a best-case scenario (i.e., where 32 consecutive FBNs are received that fall into the FBN range of the node), a modified BST may represent up to 32 FBNs using only 5 words of memory space. This is in comparison to a conventional BST that requires 128 words of memory space for representing 32 FBNs. In a best case scenario for a modified red-black tree, each node may represent up to 32 FBNs using only 6 words of memory space. This is in comparison to a conventional red-black tree that requires 160 words of memory space for representing 32 FBNs. In less than best-case scenarios, use of the modified BSTs will also typically provide substantial memory savings. A node of a modified BST only needs to represent 2 FBNs to experience memory savings over conventional methods (since 5 words are thus being used to represent 2 FBNs, compared to 10 words or 12 words needed to represent 2 FBNs in conventional BSTs or red-black trees, respectively).

III. Methods for Queuing Write Blocks Using Queuing Data Structures

In some embodiments, the queuing data structures 290 may comprise modified binary search trees (BSTs), such as modified red-black trees. As known in the art, a BST may comprise a node based binary tree data structure, each node in the BST having a key value. A BST may comply with the following rules: a) The left subtree of a node contains only nodes with key values less than the node's key value; b) The right subtree of a node contains only nodes with key values greater than the node's key value; c) Both the left and right subtrees must also be binary search trees. When used to queue write blocks, the key value of a node comprises an FBN value. Each node may contain 4 data fields, including fields for: its key value (i.e., the FBN it represents), a pointer to the parent node, a pointer to the left child node, and a pointer to the right child node.

Red-black search trees, in particular, is a particular type of BST that provide promising features for write block queuing, such as self-balancing for efficient operations. For a BST comprising a red-black search tree, each node may also contain an additional color field for indicating the associated color of the node (red or black) and may comply with the following additional rules: a) Every node is either red or black; b) Every leaf is black; c) The root node is black; d) If a node is red, then both its children are black; e) Every path from the root node to a leaf, or to a NIL child, must contain the same number of black nodes. By constraining the way nodes can be colored on any path from the root to a leaf, red-black trees ensure that no such path is more than twice as long as any other, so that the tree is approximately balanced. As such, a red-black tree may comprise a BST that inserts nodes intelligently, to ensure the tree is reasonably balanced.

In general, an advantage of all BSTs is that the various tree operations performed on the BST can be very efficient. For queuing received FBNs of write blocks, such operations may include search, insert/sort, and traverse operations using the key values of the nodes. Similar tree operations may also be performed on the queuing data structures 290 by using the base FBN and range value of each node in place of the key value. For example, a search operation on the queuing data structures 290 may use the base FBN and range value, an insert/sort operation may use the base FBN, and a traverse operation may use the base FBN and range value of a node (as discussed below). Using the queuing data structure 290 may improve the speed of the operations since the queuing data structure will have a reduced tree height (due to the lower total node count) and the operations processing the nodes of the queuing data structure may require less time.

Figure 6:
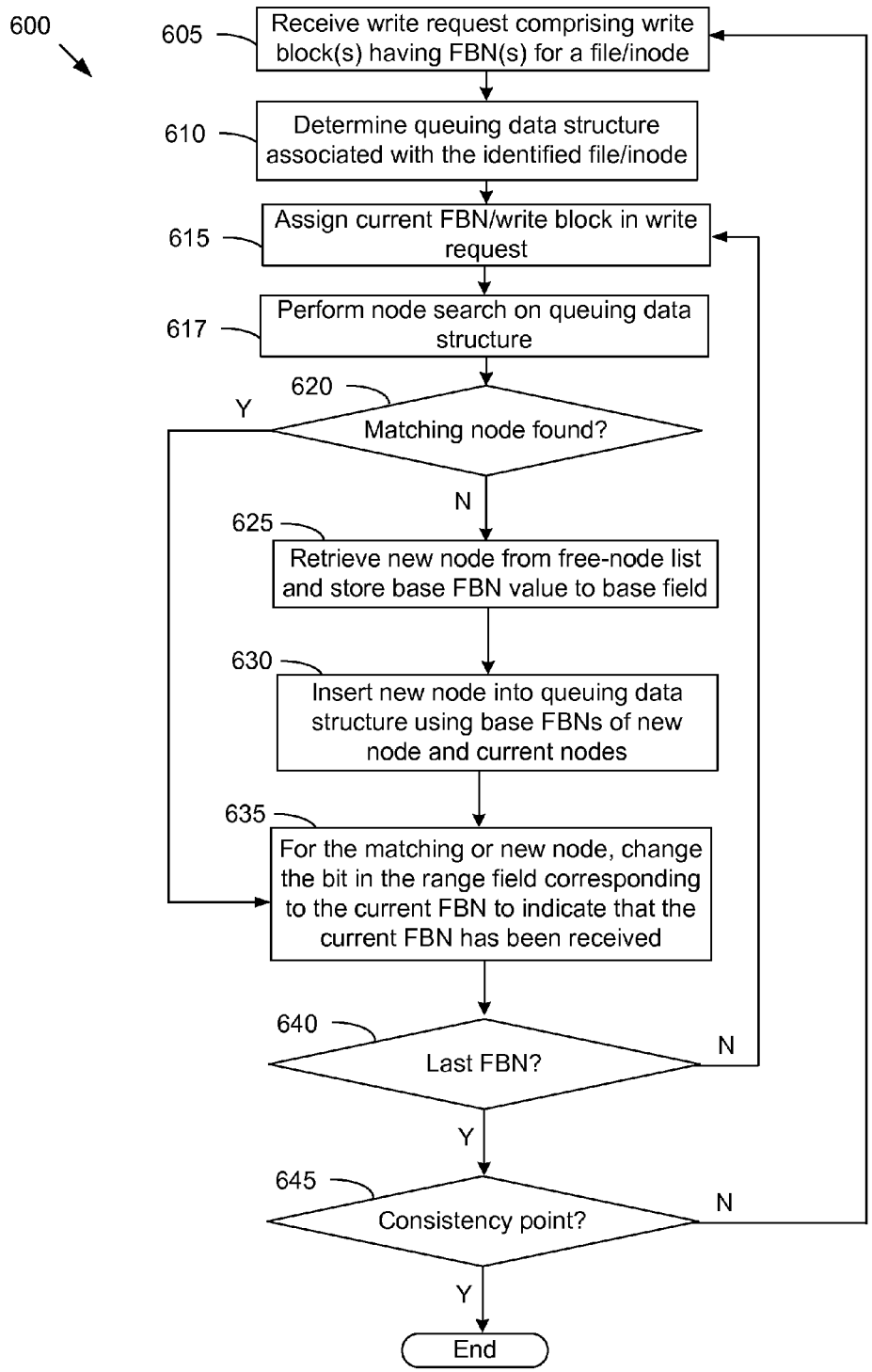
FIG. 6 is a flowchart of a method for queuing and sorting received FBNs in the queuing data structure 290.
Figure 7:
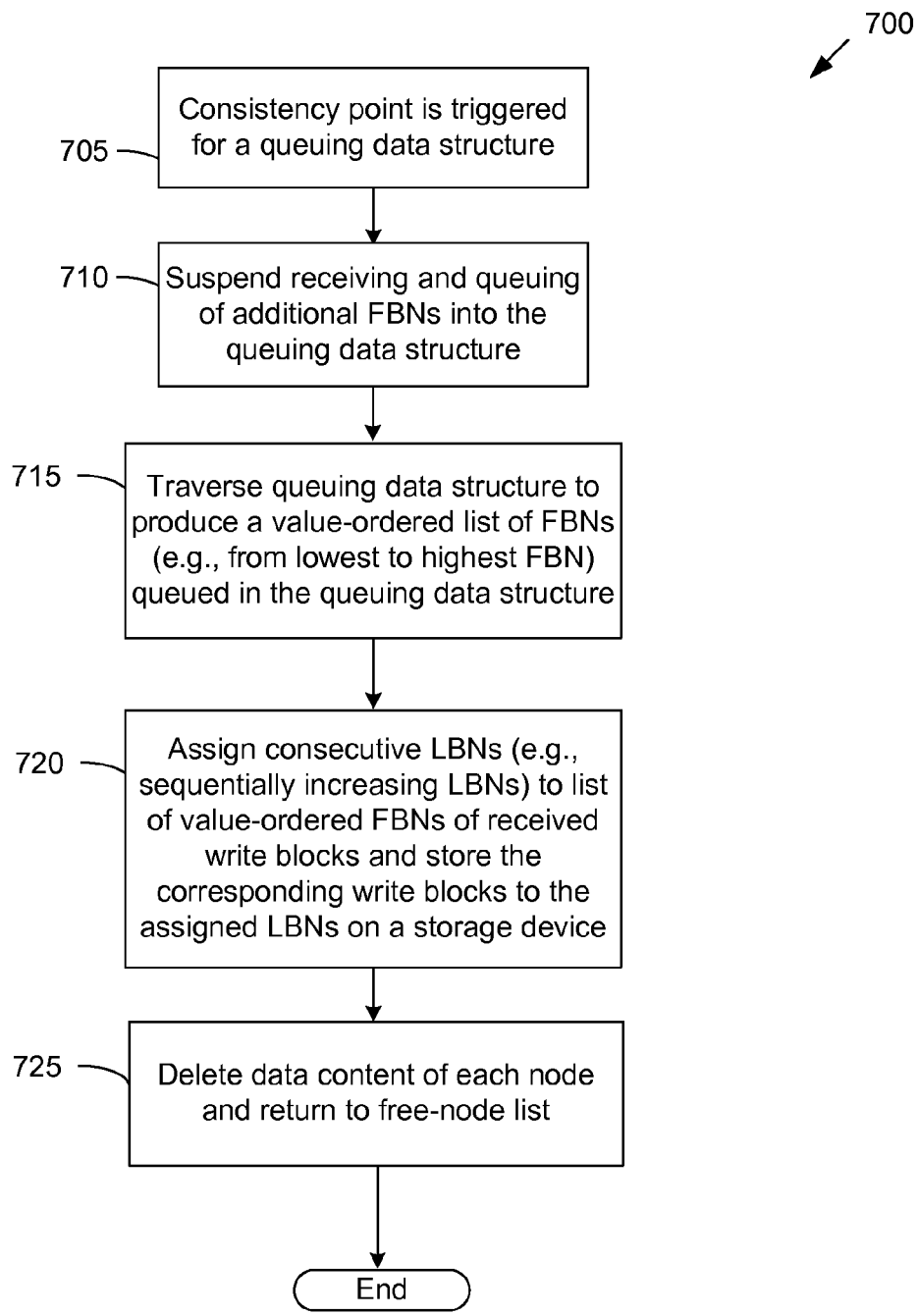
FIG. 7 is a flowchart of a method for traversing the queuing data structure to produce a value-ordered list of received FBNs for a file.

FIGS. 6 and 7 are flowcharts of methods 600 and 700 for processing received FBNs for write blocks of a file using a queuing data structure 290. FIG. 6 is a flowchart of a method 600 for queuing and sorting received FBNs in the queuing data structure 290 prior to a consistency point. Before the consistency point is triggered, received FBNs for a file may be processed in the queuing data structure 290 using search and insert/sort operations to sort the received FBNs based on the values of the received FBNs. FIG. 7 is a flowchart of a method 700 for traversing the queuing data structure 290, after a consistency point is triggered, to produce a value-ordered list of received FBNs for a file (e.g., from lowest to highest FBN) using a traverse operation. For example, the consistency point may be triggered at predetermined time intervals or when a predetermined number of write blocks have been received. In other embodiments, the consistency point is triggered for other reasons. The list of value-ordered FBNs of received write blocks may then be assigned consecutive LBNs and the corresponding write blocks stored to the assigned LBNs. As discussed above, assigning LBNs to value ordered FBNs may be preferred over assigning LBNs as the FBNs are received (i.e., time ordered FBNs) to reduce file fragmentation and read latency.

In some embodiments, prior to the methods 600 and 700 being performed, preparation processes may be performed. For example, the file system 350 may assign/associate a queuing data structure 290 to each file/inode in the file system (e.g., by storing a NIL pointer to a root node of an associated queuing data structure 290 in each inode). Also, the file system 350 may produce and associate a "free-node list" for each queuing data structure 290, the free-node list comprising "empty" nodes that may be used in the associated queuing data structure 290. The file system 350 may produce a predetermined number of empty nodes for each list, each empty node comprising a plurality of data fields (e.g., fields for color, pointer to parent, pointer to left child, pointer to right child, base FBN, and/or range value), each field containing null data. For example, all bits in the data fields may be preset to equal "0." The empty nodes on a free-node list may comprise nodes having null data that are not currently in use and may be retrieved from the list and inserted into the associated queuing data structure 290 by the queuing module 275 when needed. The file system 350 may produce additional empty nodes for each list if needed.

FIG. 6 is a flowchart of a method 600 for queuing and sorting received FBNs (for write blocks of a file) in the queuing data structure 290. In some embodiments, some of the steps of the method 600 are implemented by software and/or hardware. In some embodiments, some of the steps of method 600 are performed by the queuing module 275 in conjunction with other layers of the storage operating system 300. The order and number of steps of the method 600 are for illustrative purposes only and, in other embodiments, a different order and/or number of steps are used.

The method 600 begins by receiving (at 605) a write request comprising an inode number (identifying a file/inode), one or more blocks of data to be written (write blocks), and a file block number (FBN) for each write block. The method 600 then determines and locates (at 610) the queuing data structure 290 associated with the identified file/inode (e.g., by using a pointer to the queuing data structure 290 stored in the inode). The method then assigns (at 615) a received FBN/write block in the write request as a current FBN/write block. The method may do so by retrieving one FBN out of a receiving pool.

The method then performs (at 617) a search for a node in the queuing data structure that matches the current FBN. For the current FBN, the method 600 determines (at 620) whether there is a "matching node" in the queuing data structure 290, the matching node comprising an FBN range that includes/encompasses the current FBN. The method may determine the FBN range of a node in the queuing data structure 290 using the base FBN and the number of bits (X) in the range field (as discussed above). In the queuing data structure 290, the order of nodes examined by method may be determined using a conventional search technique used for BSTs. For example, a recursive or iterative technique may be used that first examines the root node, if the root node is not a matching node, then examines the left child node if the current FBN is less than the FBN range of the root node and examines the right child node if the current FBN is greater than the FBN range of the root node, whereby the process is repeated until a matching node is determined to be found or not found in the queuing data structure.

If a matching node is found (at 620—Yes), the method continues at step 635. If a matching node is not found (at 620—No), the method 600 retrieves (at 625) a new node from the free-node list associated with the queuing data structure 290 and stores a base FBN value to the base field of the new node. The base FBN value may be determined by first determining the FBN range of the new node using the current FBN value and the number of bits (X) in the range field. For example, if the number of bits (X) in the range field is 32, the FBN ranges of the nodes in the queuing data structure 290 may be configured as follows: FBN 0-31, FBN 32-63, FBN 64-95, FBN 96-127, FBN 128-159, FBN 160-191, etc. As such, the base FBN may comprise the lowest FBN in the FBN range that includes the current FBN (e.g., FBN 0, 32, 64, 96, etc.).

The method 600 then inserts (at 630) the new node (having the new base FBN) into the queuing data structure 290. The method may do so using conventional insert/sort techniques based on the new base FBN of the new node and the base FBNs of the current nodes in the queuing data structure 290. For example, a recursive or iterative technique may be used that first examines the root node, if the root node does not have a base FBN that equals the new base FBN, then examines the left child node if the new base FBN is less than the base FBN of the root node and examining the right child node if the new base FBN is greater than the base FBN of the root node, whereby the process is repeated until a leaf node is reached, whereby the new node is added as the leaf node's right or left child node, depending on the new base FBN value of the new node. As such, the new node is inserted into the queuing data structure 290 using insert/sort techniques (based on the base FBNs of the nodes) to produce a queuing data structure 290 that complies with BST or red-black tree rules.

For the matching node (if coming from step 620) or the new node (if coming from step 630), the method 600 then changes (at 635) the bit in the range field corresponding to the current FBN to indicate that the current FBN has been received (e.g., change the corresponding bit to "1" in the range field). The bit position in the range field of the corresponding bit for the current FBN may be determined by the base bit position (corresponding to the base FBN) and an offset from the base bit that is based on the difference in the values between the current FBN and the base FBN (as discussed above).

The method 600 then determines (at 640) if the current FBN is the last received FBN of the write request to be processed. If not, the method returns to step 615 where it assigns a next received FBN/write block of the write request as the current FBN/write block. If so, the method proceeds to step 645 where it determines whether a consistency point has been triggered. If not, the method continues at step 605 where a next write request is received. If so, the method 600 ends and the method of 700 of FIG. 7 is then performed.

FIG. 7 is a flowchart of a method 700 for traversing the queuing data structure 290 to produce a value-ordered list of received FBNs for a file. In some embodiments, some of the steps of the method 700 are implemented by software and/or hardware. In some embodiments, some of the steps of method 700 are performed by the queuing module 275 in conjunction with other layers of the storage operating system 300. The order and number of steps of the method 700 are for illustrative purposes only and, in other embodiments, a different order and/or number of steps are used.

The method 700 of FIG. 7 begins after a consistency point is triggered (at 705) for a particular queuing data structure 290. In some embodiments, the file system may produce and maintain a plurality of queuing data structures 290 for a plurality of files/inodes, a consistency point being triggered independently for each queuing data structure 290. For example, the consistency point of a queuing data structure 290 may be triggered at predetermined time intervals or when a predetermined number of FBNs/write blocks have been received and queued to the queuing data structure 290 (e.g., using the method 600 of FIG. 6). In other embodiments, the consistency point is triggered for other reasons. The method 700 then suspends (at 710) receiving and queuing of additional FBNs into the queuing data structure 290.

The method 700 then traverses/walks (at 715) the queuing data structure 290 to produce a value-ordered list of FBNs (e.g., from lowest to highest FBN) queued in the queuing data structure 290, the FBNs being received for write blocks of a file/inode associated with the queuing data structure 290 since the last consistency point. The method may do so using conventional traverse techniques for BSTs to examine each node in the queuing data structure 290. For example, a traverse technique may be used that recursively examines the left subtree of a node starting from the bottom (comprising the node with the lowest base FBN), examines the node itself, then recursively examines the right subtree of the node, continuing this pattern with each node in the queuing data structure 290 as it's recursively examined. Note that the method 700 may use the base FBNs of the nodes with conventional traverse techniques to determine the order of nodes to be examined in the queuing data structure 290. Upon examining a particular node, however, the method may use the base FBN and range value of the node to determine which FBN(s) in the FBN range of the node have been received, and add those received FBNs to the ordered list based on the FBN values. In some embodiments, the method 700 may produce (at 715) a list of FBNs, in sequence from lowest to highest FBN, that were received for write blocks of the file/inode associated with the queuing data structure 290 since the last consistency point.

The method 700 assigns (at 720), as much as possible, consecutive LBNs (e.g., sequentially increasing LBNs) to the list of value-ordered FBNs of received write blocks and stores the corresponding write blocks to the assigned LBNs on a storage device 125. As discussed above, assigning LBNs to value-ordered FBNs may be preferred over assigning LBNs as the FBNs are received (i.e., time ordered FBNs) to reduce file fragmentation and read latency. The method 700 then deletes (at 725) data content of each node in the queuing data structure 290 and returns each node to the free-node list associated with the queuing data structure 290. The method 700 then ends.

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software application, module, or layer described herein may comprise an engine comprising firmware or software and hardware configured to perform embodiments described herein. In general, functions of a software application, module, or layer described herein may be embodied directly in hardware, or embodied as software executed by a processor, or embodied as a combination of the two. A software application, module, or layer may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A storage system for queuing received write blocks prior to storing the write blocks to a storage device, the storage system comprising:
at least one storage device for storing write blocks; and
an operating system configured for:
receiving a plurality of file block numbers (FBNs) of write blocks for a file; and
providing a queuing data structure for representing the received FBNs of the write blocks for the file and queuing the received FBNs prior to storing write blocks corresponding to the received FBNs to the at least one storage device, the queuing data structure comprising at least one node, each node comprising a range field representing an FBN range of at least two FBNs, the range field indicating whether one or more FBNs in the FBN range is in the plurality of received FBNs; and
using the queuing data structure, processing the received FBNs of the write blocks for assigning a logical block number (LBN) for each received FBN, the LBN indicating a storage location on a storage device, wherein:
the range field comprises X bits, X comprising an integer greater than 1;
the number of FBNs represented by the range field is equal to X;
each bit in the range field corresponds to an FBN in the FBN range for indicating whether the corresponding FBN is in the plurality of received FBNs;
each node in the queuing data structure further comprises a base field for storing a base FBN, the base FBN being within the FBN range; and
the values of the FBN range represented by the node are based on the base FBN.

2. The storage system of claim 1, wherein:
a bit in the range field corresponding to an FBN is equal to 1 if the FBN is in the plurality of received FBNs and is equal to 0 if the FBN is not in the plurality of received FBNs, or a bit in the range field corresponding to an FBN is equal to 0 if the FBN is in the plurality of received FBNs and is equal to 1 if the FBN is not in the plurality of received FBNs.

3. The storage system of claim 1, wherein:
the FBN range comprises base FBN through (base FBN+X−1) or comprises (base FBN−X−1) through base FBN.

4. The storage system of claim 1, wherein:
the base FBN corresponds to a base bit in the range field, wherein the corresponding bit for each non-base FBN in the FBN range has an offset from the base bit within the range field that is based on the difference in values between the non-base FBN and the base FBN.

5. The storage system of claim 1, wherein processing the received FBNs comprises ordering the received FBNs based on the values of the FBNs for assigning consecutive LBNs to the ordered FBNs.

6. The storage system of claim 1, wherein:
the queuing data structure comprises a binary search tree, wherein each node has one parent node, one left child node having a lower base FBN, and one right child node having a higher base FBN; and
each node further comprises fields for a base FBN, a pointer to the parent node, a pointer to the left child node, and a pointer to the right child node.

7. The storage system of claim 1, wherein:
the queuing data structure comprises a red-black search tree, wherein each node has one parent node, one left child node having a lower base FBN, one right child node having a higher base FBN, and an associated color; and
each node further comprises fields for a base FBN, a pointer to the parent node, a pointer to the left child node, a pointer to the right child node, and node color.

8. A non-transitory computer readable medium having instructions stored thereon when executed by a processor, queue received write blocks prior to storing the write blocks to a storage device, the computer readable medium comprising sets of instructions for:
receiving a plurality of file block numbers (FBNs) of write blocks for a file; and
providing a queuing data structure for representing the received FBNs of the write blocks for the file and queuing the received FBNs prior to storing write blocks corresponding to the received FBNs to the at least one storage device, the queuing data structure comprising at least one node, each node comprising a range field representing an FBN range of at least two FBNs, the range field indicating whether one or more FBNs in the FBN range is in the plurality of received FBNs; and using the queuing data structure, processing the received FBNs of the write blocks for assigning a logical block number (LBN) for each received FBN, the LBN indicating a storage location on the storage device, wherein:

the range field comprises X bits, X comprising an integer greater than 1;

the number of FBNs represented by the range field is equal to X;

each bit in the range field corresponds to an FBN in the FBN range for indicating whether the corresponding FBN is in the plurality of received FBNs;

each node in the queuing data structure further comprises a base field for storing a base FBN, the base FBN being within the FBN range; and the values of the FBN range represented by the node are based on the base FBN.

9. The non-transitory computer readable medium of claim 8, wherein:

a bit in the range field corresponding to an FBN is equal to 1 if the FBN is in the plurality of received FBNs and is equal to 0 if the FBN is not in the plurality of received FBNs, or a bit in the range field corresponding to an FBN is equal to 0 if the FBN is in the plurality of received FBNs and is equal to 1 if the FBN is not in the plurality of received FBNs.

10. The non-transitory computer readable medium of claim 8, wherein:

the FBN range comprises base FBN through (base FBN+X−1) or comprises (base FBN−X−1) through base FBN.

11. The non-transitory computer readable medium of claim 8, wherein:

the base FBN corresponds to a base bit in the range field, wherein the corresponding bit for each non-base FBN in the FBN range has an offset from the base bit within the range field that is based on the difference in values between the non-base FBN and the base FBN.

12. The non-transitory computer readable medium of claim 8, wherein processing the received FBNs comprises ordering the received FBNs based on the values of the FBNs for assigning consecutive LBNs to the ordered FBNs.

13. The non-transitory computer readable medium of claim 8, wherein:

the queuing data structure comprises a binary search tree, wherein each node has one parent node, one left child node having a lower base FBN, and one right child node having a higher base FBN; and each node further comprises fields for a base FBN, a pointer to the parent node, a pointer to the left child node, and a pointer to the right child node.

14. The non-transitory computer readable medium of claim 8, wherein:

the queuing data structure comprises a red-black search tree, wherein each node has one parent node, one left child node having a lower base FBN, one right child node having a higher base FBN, and an associated color; and each node further comprises fields for a base FBN, a pointer to the parent node, a pointer to the left child node, a pointer to the right child node, and node color.

15. A storage system for queuing received write blocks prior to storing the write blocks to a storage device, the storage system comprising:

at least one storage device for storing write blocks; and an operating system configured for:

receiving a plurality of file block numbers (FBNs) of write blocks for a file; and providing a queuing data structure for representing the received FBNs of the write blocks for the file and queuing the received FBNs prior to storing write blocks corresponding to the received FBNs to the at least one storage device, the queuing data structure comprising at least one node comprising a range field comprising X bits, X comprising an integer greater than 1, each bit in the range field corresponding to an FBN for indicating whether the corresponding FBN is in the plurality of received FBNs; and using the queuing data structure, processing the received FBNs of the write blocks for assigning a logical block number (LBN) for each received FBN, the LBN indicating a storage location on a storage device, wherein:

each node in the queuing data structure further comprises a base field for storing a base FBN, the base FBN being within the FBN range; and the values of the FBN range represented by the node are based on the base FBN.

16. The storage system of claim 15, wherein:

a bit in the range field corresponding to an FBN is equal to 1 if the FBN is in the plurality of received FBNs and is equal to 0 if the FBN is not in the plurality of received FBNs, or a bit in the range field corresponding to an FBN is equal to 0 if the FBN is in the plurality of received FBNs and is equal to 1 if the FBN is not in the plurality of received FBNs.

17. A non-transitory computer readable medium having instructions stored thereon when executed by a processor, queue received write blocks prior to storing the write blocks to a storage device, the computer readable medium comprising sets of instructions for:

receiving a plurality of file block numbers (FBNs) of write blocks for a file; and providing a queuing data structure for representing the received FBNs of the write blocks for the file and queuing the received FBNs prior to storing write blocks corresponding to the received FBNs to the at least one storage device, the queuing data structure comprising at least one node comprising a range field comprising X bits, X comprising an integer greater than 1, each bit in the range field corresponding to an FBN for indicating whether the corresponding FBN is in the plurality of received FBNs; and using the queuing data structure, processing the received FBNs of the write blocks for assigning a logical block number (LBN) for each received FBN, the LBN indicating a storage location on a storage device, wherein:

each node in the queuing data structure further comprises a base field for storing a base FBN, the base FBN being within the FBN range; and the values of the FBN range represented by the node are based on the base FBN.

18. The non-transitory computer readable medium of claim 17, wherein:

a bit in the range field corresponding to an FBN is equal to 1 if the FBN is in the plurality of received FBNs and is equal to 0 if the FBN is not in the plurality of received FBNs, or a bit in the range field corresponding to an FBN is equal to 0 if the FBN is in the plurality of received FBNs and is equal to 1 if the FBN is not in the plurality of received FBNs.

19. A storage system for queuing received write blocks prior to storing the write blocks to a storage device, the storage system comprising:

at least one storage device for storing write blocks; and
an operating system configured for:
  receiving a plurality of file block numbers (FBNs) of write blocks for a file; and
  representing each received FBN in a queuing data structure for the file and queuing the received FBNs prior to storing write blocks corresponding to the received FBNs to the at least one storage device, the queuing data structure comprising at least one node, each node comprising a range field representing an FBN range of at least two FBNs, the range field indicating whether one or more FBNs in the FBN range is in the plurality of received FBNs;
  ordering the received FBNs using the queuing data structure to produce a value ordered list of FBNs; and
  assigning a logical block number (LBN) for each received FBN based on the value ordered list of FBNs, the LBN indicating a storage location on a storage device, wherein:
    the range field comprises X bits, X comprising an integer greater than 1;
    the number of FBNs represented by the range field is equal to X;
    each bit in the range field corresponds to an FBN in the FBN range for indicating whether the corresponding FBN is in the plurality of received FBNs;
    each node in the queuing data structure further comprises a base field for storing a base FBN, the base FBN being within the FBN range; and
    the values of the FBN range represented by the node are based on the base FBN.

20. A storage system for queuing received write blocks prior to storing the write blocks to a storage device, the storage system comprising:
at least one storage device for storing write blocks; and
an operating system configured for:
  receiving a plurality of file block numbers (FBNs) of write blocks for a file; and
  providing a queuing data structure for representing the received FBNs of the write blocks for the file and queuing the received FBNs prior to storing write blocks corresponding to the received FBNs to the at least one storage device, the queuing data structure comprising at least one node, each node comprising a range field representing an FBN range of at least two FBNs, the range field indicating whether one or more FBNs in the FBN range is in the plurality of received FBNs; and
  using the queuing data structure, processing the received FBNs of the write blocks for assigning a logical block number (LBN) for each received FBN, the LBN indicating a storage location on a storage device, wherein:
    each bit in the range field corresponds to an FBN in the FBN range for indicating whether the corresponding FBN is in the plurality of received FBNs;
    a bit in the range field corresponding to an FBN is equal to 1 if the FBN is in the plurality of received FBNs and is equal to 0 if the FBN is not in the plurality of received FBNs, or a bit in the range field corresponding to an FBN is equal to 0 if the FBN is in the plurality of received FBNs and is equal to 1 if the FBN is not in the plurality of received FBNs;
    each node in the queuing data structure further comprises a base field for storing a base FBN, the base FBN being within the FBN range; and
    the values of the FBN range represented by the node are based on the base FBN.

21. A storage system for queuing received write blocks prior to storing the write blocks to a storage device, the storage system comprising:
at least one storage device for storing write blocks; and
an operating system configured for:
  receiving a plurality of file block numbers (FBNs) of write blocks for a file; and
  providing a queuing data structure for representing the received FBNs of the write blocks for the file and queuing the received FBNs prior to storing write blocks corresponding to the received FBNs to the at least one storage device, the queuing data structure comprising at least one node, each node comprising a range field representing an FBN range of at least two FBNs, the range field indicating whether one or more FBNs in the FBN range is in the plurality of received FBNs; and
  using the queuing data structure, processing the received FBNs of the write blocks for assigning a logical block number (LBN) for each received FBN, the LBN indicating a storage location on a storage device, wherein:
    the queuing data structure comprises a binary search tree, wherein each node has one parent node, one left child node having a lower base FBN, and one right child node having a higher base FBN;
    each node further comprises fields for a base FBN, a pointer to the parent node, a pointer to the left child node, and a pointer to the right child node;
    each node in the queuing data structure further comprises a base field for storing a base FBN, the base FBN being within the FBN range; and
    the values of the FBN range represented by the node are based on the base FBN.

22. A non-transitory computer readable medium having instructions stored thereon when executed by a processor, queue received write blocks prior to storing the write blocks to a storage device, the computer readable medium comprising sets of instructions for:
  receiving a plurality of file block numbers (FBNs) of write blocks for a file; and
  providing a queuing data structure for representing the received FBNs of the write blocks for the file and queuing the received FBNs prior to storing write blocks corresponding to the received FBNs to the at least one storage device, the queuing data structure comprising at least one node, each node comprising a range field representing an FBN range of at least two FBNs, the range field indicating whether one or more FBNs in the FBN range is in the plurality of received FBNs; and
  using the queuing data structure, processing the received FBNs of the write blocks for assigning a logical block number (LBN) for each received FBN, the LBN indicating a storage location on the storage device, wherein:
    each bit in the range field corresponds to an FBN in the FBN range for indicating whether the corresponding FBN is in the plurality of received FBNs;
    a bit in the range field corresponding to an FBN is equal to 1 if the FBN is in the plurality of received FBNs and is equal to 0 if the FBN is not in the plurality of received FBNs, or a bit in the range field corresponding to an FBN is equal to 0 if the FBN is in the plurality of received FBNs and is equal to 1 if the FBN is not in the plurality of received FBNs;
    each node in the queuing data structure further comprises a base field for storing a base FBN, the base FBN being within the FBN range; and the values of the FBN range represented by the node are based on the base FBN.

23. A non-transitory computer readable medium having instructions stored thereon when executed by a processor, queue received write blocks prior to storing the write blocks to a storage device, the computer readable medium comprising sets of instructions for:
  receiving a plurality of file block numbers (FBNs) of write blocks for a file; and
  providing a queuing data structure for representing the received FBNs of the write blocks for the file and queuing the received FBNs prior to storing write blocks corresponding to the received FBNs to the at least one storage device, the queuing data structure comprising at least one node, each node comprising a range field representing an FBN range of at least two FBNs, the range field indicating whether one or more FBNs in the FBN range is in the plurality of received FBNs; and
  using the queuing data structure, processing the received FBNs of the write blocks for assigning a logical block number (LBN) for each received FBN, the LBN indicating a storage location on the storage device, wherein:
    the queuing data structure comprises a binary search tree, wherein each node has one parent node, one left child node having a lower base FBN, and one right child node having a higher base FBN;
    each node further comprises fields for a base FBN, a pointer to the parent node, a pointer to the left child node, and a pointer to the right child node;
    each node in the queuing data structure further comprises a base field for storing a base FBN, the base FBN being within the FBN range; and
    the values of the FBN range represented by the node are based on the base FBN.

* * * * *